United States Patent
Hennessy et al.

(10) Patent No.: US 7,256,403 B2
(45) Date of Patent: Aug. 14, 2007

(54) PHOTODIODE FOR IMAGING SYSTEM AND METHOD OF MAKING

(75) Inventors: William Andrew Hennessy, Schenectady, NY (US); Douglas Albagli, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 197 days.

(21) Appl. No.: 10/955,295

(22) Filed: Sep. 30, 2004

(65) Prior Publication Data

US 2006/0065843 A1    Mar. 30, 2006

(51) Int. Cl.
*G01T 1/20*    (2006.01)
(52) U.S. Cl. .................................. 250/370.11
(58) Field of Classification Search ............ 250/370.11
See application file for complete search history.

(56) References Cited

U.S. PATENT DOCUMENTS

| | | | |
|---|---|---|---|
| 5,610,403 A | 3/1997 | Kingsley et al. | 250/370.09 |
| 5,648,654 A | 7/1997 | Possin | 250/208.1 |
| 2003/0043967 A1* | 3/2003 | Aufrichtig et al. | 378/207 |

* cited by examiner

*Primary Examiner*—David Porta
*Assistant Examiner*—Mindy Vu
(74) *Attorney, Agent, or Firm*—Fletcher Yoder

(57) ABSTRACT

A photo-detector having a common electrode comprising a conductive material configured in a non-solid pattern in which there are gaps where there is no conductive material. In one embodiment, the distance (d) or (d') between conductive portions of the common electrode is in a range from about 3 microns to about 5 microns. Alternatively, in one embodiment, the patterned common electrode covers between 20% to 70% of the surface of the respective photosensor element. A method for making the same is also provided.

20 Claims, 4 Drawing Sheets

PHOTODIODE FOR IMAGING SYSTEM AND METHOD OF MAKING

BACKGROUND

The invention relates generally to the field of imaging systems. In particular, the invention relates to the detection of X-rays in an X-ray imaging device.

Non-invasive imaging broadly encompasses techniques for generating images of the internal structures or regions of a person or object that are otherwise inaccessible for visual inspection. For example, non-invasive imaging techniques are commonly used in the industrial field for inspecting the internal structures of parts and in the security field for inspecting the contents of packages, clothing, and so forth. One of the best known uses of non-invasive imaging, however, is in the medical arts where these techniques are used to generate images of organs and/or bones inside a patient which would otherwise not be visible.

One class of non-invasive imaging techniques that may be used in these various fields is based on the differential transmission of X-rays through a patient or object. In the medical context, a simple X-ray imaging technique may involve generating X-rays using an X-ray tube or other source and directing the X-rays through an imaging volume in which the part of the patient to be imaged is located. As the X-rays pass through the patient, the X-rays are attenuated based on the composition of the tissue they pass through. The attenuated X-rays then impact a detector that converts the X-rays into signals that can be processed to generate an image of the part of the patient through which the X-rays passed based on the attenuation of the X-rays. Typically the X-ray detection process utilizes a scintillator, which generates optical photons when impacted by X-rays, and an array of photosensitive elements, which generate electrical signals based on the number of optical photons detected.

Some X-ray techniques utilize very low energy X-rays so that patient exposure can be extended. For example, fluoroscopic techniques are commonly used to monitor an ongoing procedure or condition, such as the insertion of a catheter or probe into the circulatory system of a patient. Such fluoroscopic techniques typically obtain large numbers of low energy images that can be consecutively displayed to show motion in the imaged area in real-time or near real-time.

However fluoroscopic techniques, as well as other low energy imaging techniques, may suffer from poor image quality due to the relatively weak X-ray signal relative to the electronic noise attributable to the detector. As a result it is typically desirable to improve the efficiency of the detection process, such as by generating more signal at the detector for each absorbed X-ray. One factor that reduces the efficiency of the detection process is the number of optical photons absorbed or reflected between the scintillator and the photosensitive elements.

In particular, an electrode is typically situated between the scintillator and the photosensitive elements. While the electrode allows a photodiode of each photosensitive element to function properly, and thus allows the optical photons to be detected, the electrode also lies over most of the photosensitive element. Since the electrode is typically constructed of a metal, such as indium-tin-oxide (ITO) and is not completely transparent to optical light some of the optical photons generated by the scintillator are absorbed or reflected by the electrode. As a result, optical photons that might otherwise be detected, and thereby provide additional signal, never reach the photosensitive elements.

Therefore there is a need for a suitable electrode that addresses some or all of the problems set forth above.

BRIEF DESCRIPTION

In one aspect of the present technique, an X-ray imaging system is provided, where the X-ray imaging system includes an X-ray source configured to emit X-rays and a detector. Also provided with the X-ray imaging system is a detector acquisition circuitry configured to acquire the electrical signals, a system controller configured to control at least one of the X-ray source or the detector acquisition circuitry, and an image processing circuitry configured to process the electrical signals to generate an image. The detector includes a scintillator configured to emit optical photons in response to the X-rays, an array of photosensor elements configured to generate electrical signals in response to the optical photons, and a common electrode of the array of photosensor elements disposed between the scintillator and the array. The common electrode comprises a conductive material and the respective portions of the common electrode overlying each photosensor element are configured in a non-solid pattern.

In another aspect of the present technique, a photodetector is provided, where the photo-detector includes a photodiode having a common electrode comprising a conductive material configured in a non-solid pattern.

In yet another aspect of the present technique, a method of manufacturing a photo-detector is provided, where the method comprises providing a photodiode, and forming a common electrode of the photodiode from a conductive material configured in a non-solid pattern.

In still another aspect of the present technique, a method of manufacturing a detector is provided, the method comprises providing a scintillator configured to emit optical photons in response to the X-rays. An array of photosensor elements configured to generate electrical signals in response to the optical photons is coupled to the scintillator. An electrode comprising a conductive material configured in a non-solid pattern is disposed between each photosensor element and the scintillator.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
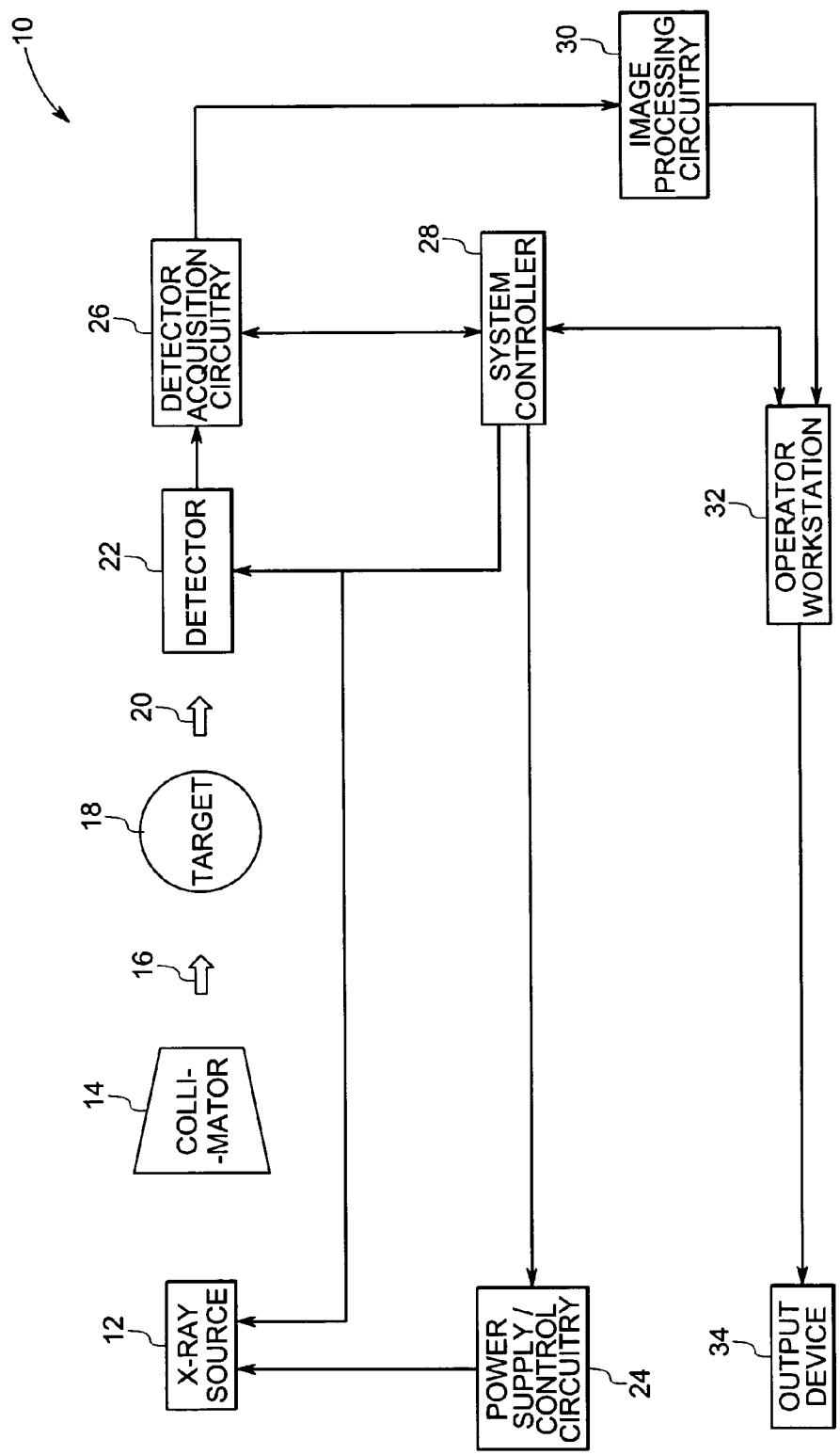
FIG. 1 is a diagrammatic representation of an exemplary X-ray imaging system, in accordance with one aspect of the present invention.

FIG. 1 is an illustration of an X-ray imaging system designated generally by a reference numeral 10. In the illustrated embodiment, the X-ray imaging system 10 is designed to acquire and process image data in accordance with the present technique, as will be described in greater detail below. The X-ray imaging system 10 includes an X-ray source 12 positioned adjacent to a collimator 14. In one embodiment, the X-ray source 12 is a low energy source and is employed in low energy imaging techniques, such as fluoroscopic techniques, or the like. Collimator 14 permits a stream of X-ray radiation 16 to pass into a region in which a target 18, such as, human patient is positioned. A portion of the radiation is attenuated by the target 18. This attenuated radiation 20 impacts a detector 22, such as a fluoroscopic detector. As described in detail below, the detector 22 converts the X-ray photons incident on its surface to electrical signals that are acquired and processed to construct an image of the features within the target 18.

The X-ray source 12 is controlled by a power supply/control circuit 24 which furnishes both power and control signals for examination sequences. Moreover, detector 22 is coupled to detector acquisition circuitry 26, which commands acquisition of the signals generated in the detector 22. Detector acquisition circuitry 26 may also execute various signal processing and filtration functions, such as, for initial adjustment of dynamic ranges, interleaving of digital, and so forth.

In the depicted exemplary embodiment, one or both of the power supply/control circuit 24 and detector acquisition circuitry 26 are responsive to signals from a system controller 28. In some exemplary systems it may be desirable to move one or both of the detector 22 or the X-ray source 12. In such systems, a motor subsystem may also be present as a component of the system controller 28 to accomplish this motion. In the present example, the system controller 28 also includes signal processing circuitry, typically based upon a general purpose or application specific digital computer, associated memory circuitry for string programs and routines executed by the computer, as well as configuration parameters and image data, interface circuits, and so forth.

Image processing circuitry 30 is also typically present in the X-ray imaging system 10. The image processing circuitry 30 receives acquired projection data from the detector acquisition circuitry 26 and processes the acquired data to generate one or more images based on X-ray attenuation.

One or more operator workstation 32 is also typically present in the X-ray imaging system 10. The operator workstation 32 allows an operator to initiate and configure an X-ray imaging examination and to view the images generated as part of the examination. For example, the system controller 28 is generally linked to operator workstation 32 so that an operator, via one or more input devices associated with the operator workstation 32, may provide instructions or commands to the system controller 28.

Similarly, the image processing circuitry 30 is linked to the operator workstation 32 such that the operator workstation 32 may receive and display the output of the image processing circuitry 30 on an output device 34, such as a display or printer. The output device 34 may include standard or special purpose computer monitors and associated processing circuitry. In general, displays, printers, operator workstations, and similar devices supplied within the system may be local to the data acquisition components or may be remote from these components, such as elsewhere within an institution or hospital or in an entirely different location. Output devices and operator workstations that are remote from the data acquisition components may be linked to the image acquisition system via one or more configurable networks, such as the internet, virtual private networks, and so forth. As will be appreciated by one of ordinary skill in the art, though the system controller 28, image processing circuitry 30, and operator workstation 32 are shown distinct from one another in FIG. 1, these components may actually be embodied in a single processor-based system, such as a general purpose or application specific digital computer. Alternatively, some or all of these components may be present in distinct processor-based systems, such as a general purpose or application specific digital computers, configured to communicate with one another. For example, the image processing circuitry 30 may be a component of a distinct reconstruction and viewing workstation.

Figure 2:
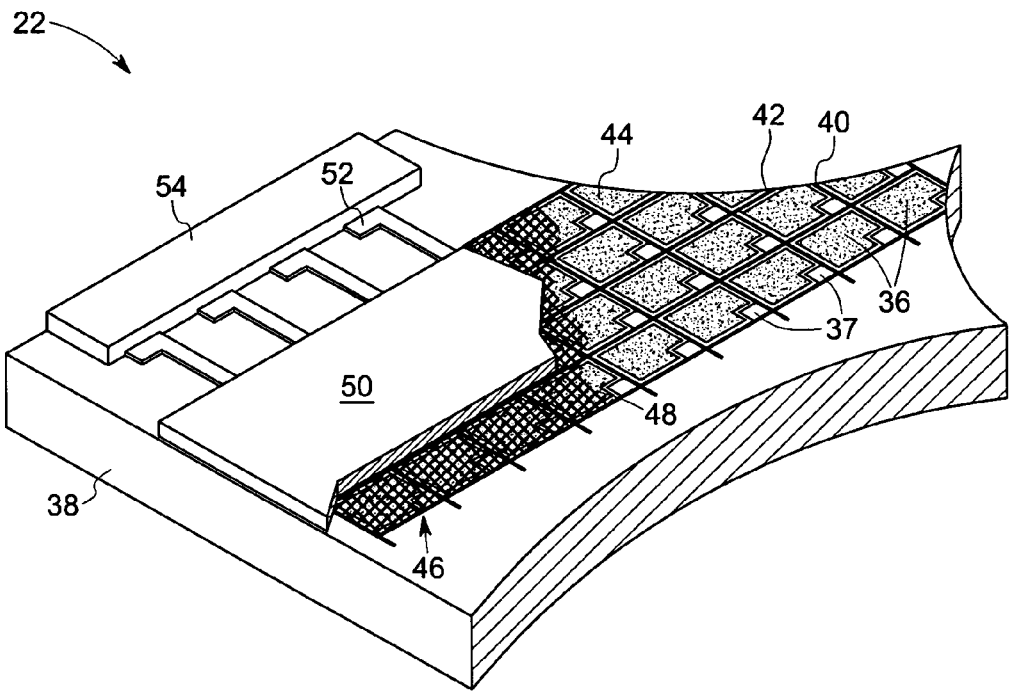
FIG. 2 is a cut-away perspective view of a detector, in accordance with one aspect of the present invention.

Referring now to FIG. 2, the detector 22 introduced in FIG. 1 is discussed in greater detail. In particular, FIG. 2 depicts an exemplary physical arrangement of the components of the detector 22, in accordance with one embodiment of the present invention. The detector 22 typically includes a glass substrate 38 on which the components described below are disposed. For example, the detector 22 includes an array of photosensor elements 36 and thin film transistors (TFT) 37 disposed on the substrate 38 as well as a scintillator 50 which generates the optical photons detected by the photosensor elements 36 when exposed to X-rays. In one embodiment, the photosensor elements 36 are photodiodes formed from silicon. In the exemplary embodiment of FIG. 2, the photodiodes are arranged in an array of rows and columns that define the pixels, or picture elements, read out by the detector acquisition circuitry 26. Further, a reflector layer might be provided on the scintillator 50 to trap the optical photons, so as to avoid losing them. In addition, a graphite cover may be provided to seal the entire detector.

In an exemplary embodiment of the present technique, each of the photosensor elements 36 comprises a photosensitive material body 44 that is electrically coupled to a patterned common electrode 46 comprised of an optically transmissive and electrically conductive material, such as indium tin oxide. As depicted in FIG. 2, the patterned common electrode 46 of the array of photosensor elements is typically disposed between the scintillator 50 and the array of photosensor elements 36. In an exemplary embodiment of the present technique, conductive portion 48 of the patterned common electrode 46 overlying each photosensor element 36 is configured in a non-solid pattern in which there are gaps where there is no conductive material between the scintillator 50 and each photosensor elements 36. In other words, the patterned common electrode 46 is not a solid layer between the photosensor elements 36 and the scintillator 50 but is still continuous and conductive such that it functions as a common electrode. In one embodiment, at the edge of the detector, the patterned common electrode 46 is continuous with the contact fingers 52, which are used to communicate signals to and from the data lines 40 and scan lines 42. In particular, these contact fingers 52 are connected to readout circuitry 54, which commands readout of all the photosensor elements 36 via the data and scan lines 40 and 42.

Figure 3:
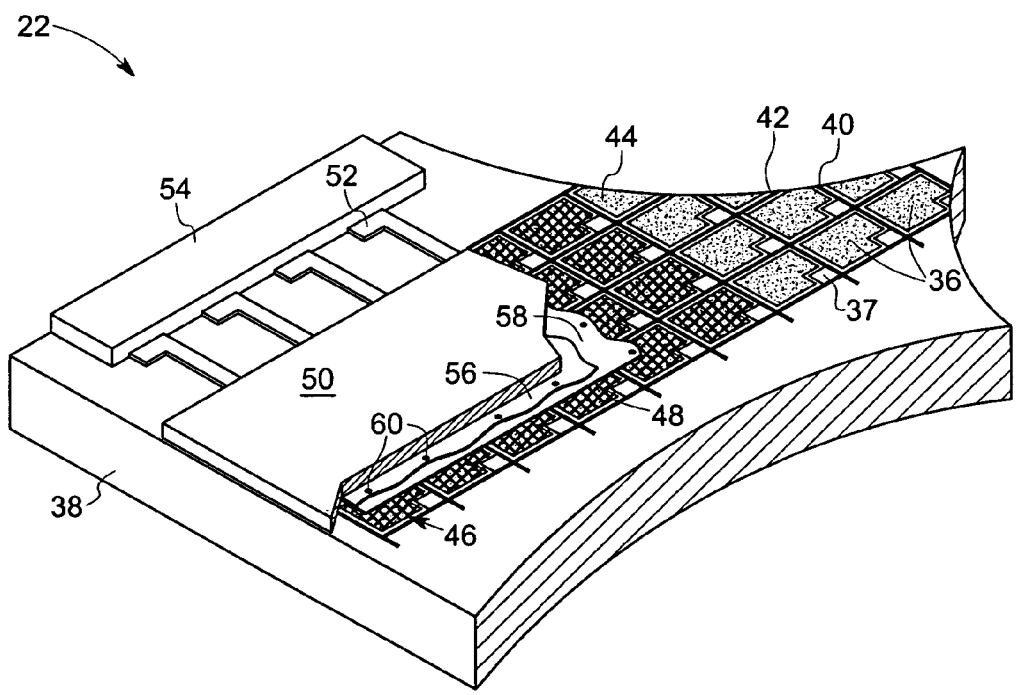
FIG. 3 is a cut-away perspective view of a detector, in accordance with another aspect of the present invention.

In another exemplary embodiment, the conductive portion 48 of the patterned common electrode 46 overlying each photosensor element 36 is confined to the boundaries of the corresponding photosensor element; that is to say, the conductive portions 48 of the patterned common electrode 46 do not overlie the data lines 40 and scan lines 42 as depicted in FIG. 3. This minimizes the capacitance between the patterned common electrode 46 and the data lines 40 and scan lines 42 and thereby helps reduce noise and improve the performance of the photosensor element 36. In this embodiment, the conductive portions 48 overlying each photosensor element 36 are connected to a conductive layer 56 disposed on a dielectric layer 58 by means of a via 60 cut through both the conductive and the dielectric layer. In this embodiment, the conductive layer 56 connects the patterned common electrode 46 to the contact fingers 52.

Figure 4:
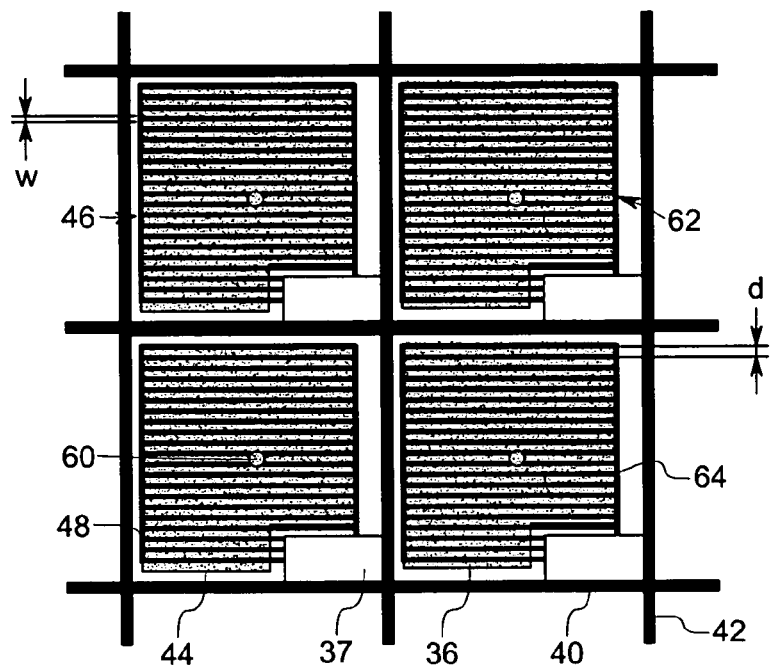
FIG. 4 is a diagrammatic representation of common electrode, in accordance with one aspect of the present invention.
Figure 5:
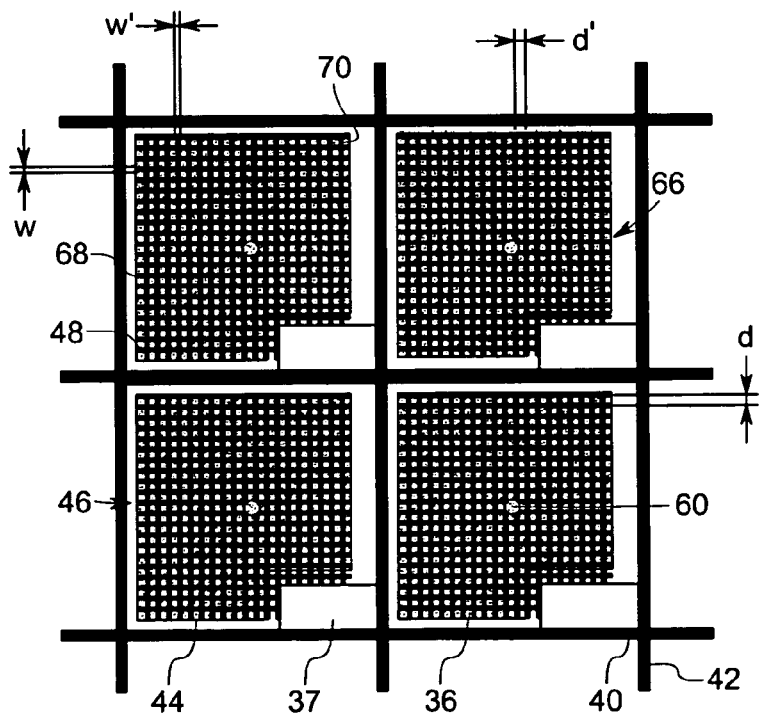
FIG. 5 is a diagrammatic representation of common electrode, in accordance with another aspect of the present invention.

With regard to the patterned common electrode 46, FIG. 3, FIG. 4, and FIG. 5 depict alternate embodiments of non-solid patterns that may be employed. In the following figures the conductive portion 48 of the patterned common electrode 46 are confined to the boundaries of the corresponding photosensor element, as depicted in FIG. 3. In alternative embodiments, the conductive portion 48 may be continuous between photosensor elements, as depicted in FIG. 2. It should be understood, therefore, that the following examples are merely illustrative and not limiting as to configurations of the patterned common electrode 46.

In these figures, the conductive portions 48 of the patterned common electrode 46 generally have a width (w) or (w') and are separated by a distance (d) or (d'). In one embodiment, the width (w) or (w') of the conductive portion 48 of the common electrode 46 is in a range from about 1 micron to about 10 microns. In another embodiment, the width (w) or (w') of the conductive portion 48 is in a range from about 3 microns to about 5 microns. In one embodiment, the distance (d) or (d') is in a range from about 1 micron to about 10 microns. In another embodiment, the distance (d) or (d') is in a range from about 3 microns to about 5 microns. Alternatively, in one embodiment, the patterned common electrode 46 covers between 20% to 70% of the surface of the respective photosensor element. In another embodiment, the patterned common electrode 46 covers no more than 50% of the surface of the respective photosensor element 36.

In order to minimize the optical absorption in the common electrode, it is desirable to have the distance (d) or (d') between the patterned common electrode 46 as large as possible. The distance may be limited, however, by the desired time constant of the pixel. The areas of the photodiode that are not covered with common electrode must transfer their charge to the common electrode by means of the p+ doped layer of the photodiode, which typically has a very low sheet resistance. The larger the distance (d) or (d') is, the longer it will take for the charge collected by the pixel to be transferred through the TFT 37 and to the read out circuitry 54. The overall time constant will depend on the capacitance of the photodiode, the conductivity and thickness of the p+ doped layer, and the distance (d) or (d'), and the resistance of the field effect transistor.

Returning now to the example of FIG. 4 the patterned common electrode 46 is formed as a bar pattern 62, according to one aspect of the present technique. In this embodiment, the conductive portion 48 of the patterned common electrode 46 is formed as rows 64 having a width (w) and separated by a distance (d), as described above FIG. 5 represents another embodiment of the patterned common electrode 46. In the exemplary embodiment of FIG. 5, the patterned common electrode overlying a photodiode is formed as a grid 66, where the conductive material forms at least one row 68 and column 70. In this embodiment, rows 68 of the grid 66 have a width (w) and are separated by the distance (d). Likewise, columns 70 of the grid 66 have a width (w') and are separated by the distance (d'). The distance (d) between the rows 68 and the distance (d') between the columns 70 may be same or different.

Figure 6:
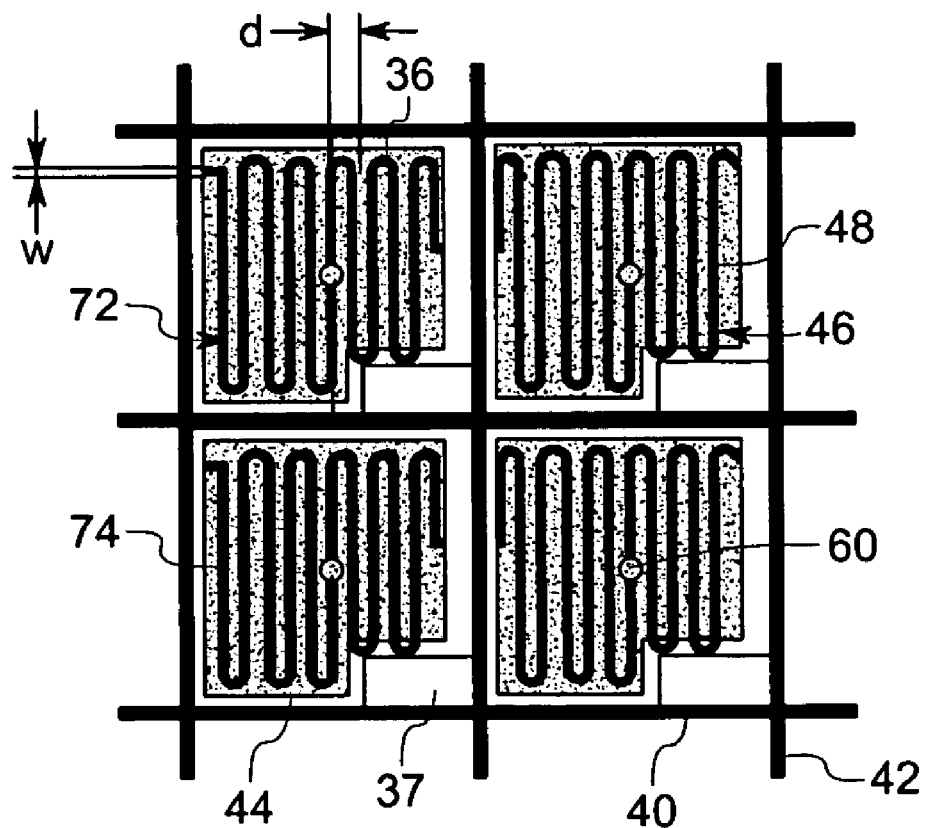
FIG. 6 is a diagrammatic representation of common electrode, in accordance with yet another aspect of the present invention.

FIG. 6 represents yet another embodiment of the patterned common electrode 46. In the exemplary embodiment of FIG. 6 the patterned common electrode overlying a photodiode is formed as a serpentine pattern 72. In this embodiment, the lines 74 of the serpentine pattern 72 have a width (w) and are separated by a distance (d). However, the distance (d) may vary depending on the location of the lines 74 on the serpentine pattern 72, i.e., the distance (d) may or may not remain uniform throughout. For example, the distance (d) near an inflection point may be less than the distance (d) away from the inflection point. While the illustrated bar pattern 62, grid patterns 66, and serpentine patterns 72 represent some of the exemplary embodiments of the present technique, other patterns, such as spiral and other curvi-linear patterns, are also within the scope of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An X-ray imaging system comprising:
an X-ray source configured to emit X-rays;
a detector comprising:
  a scintillator configured to emit optical photons in response to the X-rays;
  an array of photosensor elements configured to generate electrical signals in response to the optical photons;
  a common electrode of the array of photosensor elements disposed between the scintillator and the array, wherein common electrode comprises a conductive material, wherein the respective portions of the common electrode overlying each photosensor element are configured in a non-solid pattern such that the common electrode covers no more than 70% of the surface of the respective photosensor element;
a detector acquisition circuitry configured to acquire the electrical signals;
a system controller configured to control at least one of the X-ray source or the detector acquisition circuitry; and
an image processing circuitry configured to process the electrical signals to generate an image.

2. The X-ray imaging system of claim 1, wherein the X-ray source comprises a low-energy X-ray source.

3. The X-ray imaging system of claim 1, wherein the detector comprises a fluoroscopic detector.

4. The X-ray imaging system of claim 1, wherein the conductive material comprises indium-tin-oxide.

5. The X-ray imaging system of claim 1, wherein the non-solid pattern comprises one of a bar pattern, a grid pattern, a spiral pattern, or a serpentine pattern.

6. The X-ray imaging system of claim 1, wherein one or more conductive portions of the electrode are separated by about 1 micron to about 10 microns.

7. The X-ray imaging system of claim 1, wherein one or more conductive portions of the electrode are separated by about 3 microns to about 5 microns.

8. The X-ray imaging system of claim 1, wherein one or more conductive portions of the electrode have a width of about 1 micron to about 10 microns.

9. The X-ray imaging system of claim 1, wherein one or more conductive portions of the electrode have a width of about 3 microns to about 5 microns.

10. The X-ray imaging system of claim 1, comprising an operator workstation configured to display the image on at least one of a display or a printer.

11. A photo-detector comprising:
a photodiode having a common electrode comprising a conductive material configured in a non-solid pattern, wherein the common electrode covers no more than 70% of the surface of the photodiode.

12. The photo-detector of claim 11, wherein the photo-detector comprises a fluoroscopic detector.

13. The photo-detector of claim 11, wherein the conductive material comprises indium-tin-oxide.

14. The photo-detector of claim 11, wherein the non-solid pattern comprises one of a bar pattern, a grid pattern, a spiral pattern, or a serpentine pattern.

15. The photo-detector of claim 11, wherein one or more conductive portions of the electrode are separated by about 1 micron to about 10 microns.

16. The photo-detector of claim 13, wherein one or more conductive portions of the electrode are separated by about 3 microns to about 5 microns.

17. The photo-detector of claim 13, wherein one or more conductive portions of the electrode have a width of about 1 micron to about 10 microns.

18. The photo-detector of claim 13, wherein one or more conductive portions of the electrode have a width of about 3 microns to about 5 microns.

19. A method of manufacturing a photo-detector, the method comprising:

providing a photodiode; and forming a common electrode of the photodiode from a conductive material configured in a non-solid pattern such that the common electrode covers no more than 70% of the surface of the photodiode.

20. A method of manufacturing a detector, the method comprising:

providing a scintillator configured to emit optical photons in response to the X-rays; and coupling an array of photosensor elements configured to generate electrical signals in response to the optical photons to the scintillator such that an electrode comprising a conductive material configured in a non-solid pattern is disposed between each photosensor element and the scintillator, wherein the electrode covers no more than 70% of the surface of each respective photosensor element.

* * * * *